United States Patent
Svartz et al.

(10) Patent No.: US 6,709,014 B2
(45) Date of Patent: Mar. 23, 2004

(54) HEAVY DUTY VEHICLE FRAME

(75) Inventors: Bjorn O. Svartz, Jamestown, NC (US); Brian J. Hocart, Summerfield, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 09/935,042

(22) Filed: Aug. 22, 2001

(65) Prior Publication Data

US 2003/0038471 A1 Feb. 27, 2003

(51) Int. Cl.$^7$ .............................................. B62D 21/11
(52) U.S. Cl. ................ 280/788; 280/800; 280/124.116; 29/897.2; 72/324
(58) Field of Search ................................. 280/788, 800, 280/781, 797, 798, 799, 124.116, 124.147, 124.155; 29/897.2; 72/325, 326, 324

(56) References Cited

U.S. PATENT DOCUMENTS

| | | | |
|---|---|---|---|
| 2,154,154 A | * | 4/1939 | Eklund ........................ 280/800 |
| 3,934,895 A | * | 1/1976 | Fox .......................... 280/47.26 |
| 3,994,055 A | * | 11/1976 | Maloney, Jr. et al. ......... 72/325 |
| 4,162,090 A | | 7/1979 | Schwartz |
| 4,273,357 A | * | 6/1981 | Pashkow ............. 280/124.116 |
| 4,465,299 A | | 8/1984 | Stone et al. |
| 4,828,232 A | | 5/1989 | Harrod et al. |
| 4,923,210 A | | 5/1990 | Heider et al. |
| 4,995,636 A | | 2/1991 | Hall et al. |
| 5,004,369 A | * | 4/1991 | Young ...................... 403/232.1 |
| 5,037,126 A | * | 8/1991 | Gottschalk et al. ... 280/124.116 |
| 5,039,124 A | | 8/1991 | Widmer |
| 5,046,752 A | | 9/1991 | Stephens et al. |
| 5,058,916 A | | 10/1991 | Hicks |
| 5,346,247 A | | 9/1994 | Snyder |
| 5,366,237 A | | 11/1994 | Dilling et al. |
| 5,393,096 A | | 2/1995 | Pierce et al. |
| 5,605,364 A | * | 2/1997 | Shelledy .................. 292/259 R |
| 5,649,719 A | | 7/1997 | Wallace et al. |
| 5,785,345 A | | 7/1998 | Barlas et al. |
| 5,893,435 A | | 4/1999 | Handke et al. |
| 5,924,712 A | | 7/1999 | Pierce |
| 6,056,305 A | | 5/2000 | Pribyl |
| 6,161,853 A | * | 12/2000 | Jung .................... 280/124.136 |
| 6,434,907 B1 | * | 8/2002 | Simboli ...................... 52/731.6 |

* cited by examiner

*Primary Examiner*—Peter C. English
(74) *Attorney, Agent, or Firm*—Watts, Hoffmann Co., L.P.A.

(57) ABSTRACT

In an over the highway vehicle, a frame including a pair of elongate frame rails and a plurality of cross members is disclosed. One of the rails includes an integrally formed bracket projecting laterally. The bracket is adjacent a rail aperture formed by cutting the one rail to define the bracket and after such cutting bending the bracket out of a plane of the one rail.

21 Claims, 2 Drawing Sheets

HEAVY DUTY VEHICLE FRAME

TECHNICAL FIELD

This invention relates to Motor Vehicles and more particularly to a novel and improved heavy duty vehicle frame.

BACKGROUND OF THE INVENTION

Motor vehicles, particularly heavy duty motor vehicles, are often typically equipped with rigid frames. As an example the typical over the highway truck or tractor has two elongated channels which function as frame rails. The rails are interconnected by cross members.

As a step in frame manufacture frame rails are moved along a production line where holes are punched for attachment of brackets. Brackets are attached to the frame rail typically by passing bolts through aligned holes in the brackets and the rails. The brackets are parts which are separately manufactured and transported to the production line. Similarly fasteners which connect the brackets to the rails are manufactured elsewhere and transported to the line. Attachment of the brackets to the frames is usually manually done particularly with relatively low volume heavy duty vehicles where such assembly aids as robots are not economically justified.

Accordingly it would be desirable to provide an improved system for connecting components of a suspension system and other mechanisms to a vehicle frame.

SUMMARY OF THE INVENTION

With the present invention brackets for connecting components to frames are integrally formed in the frames. The brackets preferably are formed as frame rails are passed along a production line where conventional hole punching is accomplished.

An integral bracket is formed by first cutting a body of the rail to form the sides of a bracket cut out portion which portion remains connected along one side to the rail. A hole is punched in the cut out portion. The cut out portion is then bent typically to about 90 degrees with the body of the rail such that the cut out portion becomes a projecting apertured bracket. Subsequently during vehicle assembly a vehicle component such as a shock absorber is connected to the bracket as by passing a fastener through the aperture in the bracket.

In one form of bracket made in accordance with the invention a single cut out portion forms the bracket. The single cut out portion is disposed generally horizontally when a vehicle equipped with it is in use.

In an alternate and preferred arrangement a pair of cut out portions provide a pair of brackets which are arranged in parallel spaced relationship. The cut out portions of the pair are respectively disposed in vertical planes. The cut out portions have aligned fastener receiving holes in order that a vehicle component such as a shock absorber may be positioned between the cut out portions. A fastener projects through the aligned holes of the cut out portions and through a mounting aperture of the component to secure the component to the vehicle frame.

Accordingly the objects of the invention are to provide a novel and improved vehicle frame including at least one integrally formed bracket and a method of making such a frame.

DETAILED DESCRIPTION OF THE PREFERRED EMBODIMENT

Figure 1:
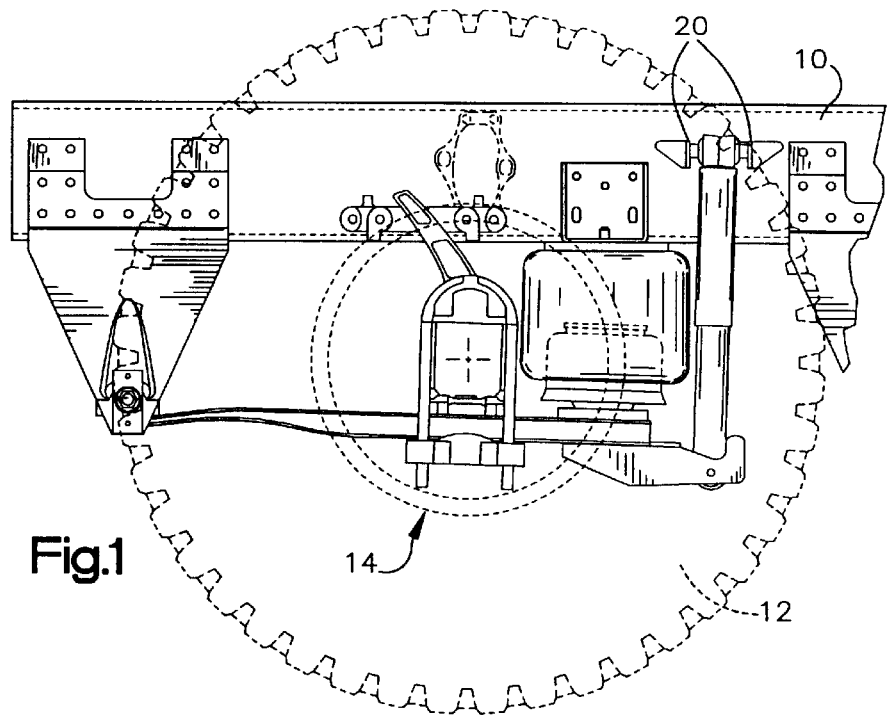
FIG. 1 is an elevational view of a section of the vehicle including a frame equipped with the integral mounting brackets of the present invention.

Referring now to the drawings, a section of the vehicle frame rail of an over the highway heavy duty truck or tractor is shown at 10. The rail 10 is one of a pair of spaced and parallel rails interconnected by cross members one of which is shown schematically at 11, FIG. 3. The frame rail 10 is a typical elongated channel which is connected to a drive train and supported by road wheels one of which is shown in FIG. 1 at 12. The wheel 12 is connected to the frame 10 by a suspension 14. The suspension 14 includes a shock absorber 16 interposed between a suspension bracket 18 and the frame rail 10. Apart from the connection of the shock absorber to the rail, the suspension is provided for environment and otherwise does not form a part of the present invention. The pictured suspension is that described and claimed in commonly owned application No. 60/212,031 filed Jun. 16, 2000 under the title Suspension.

Figure 2:
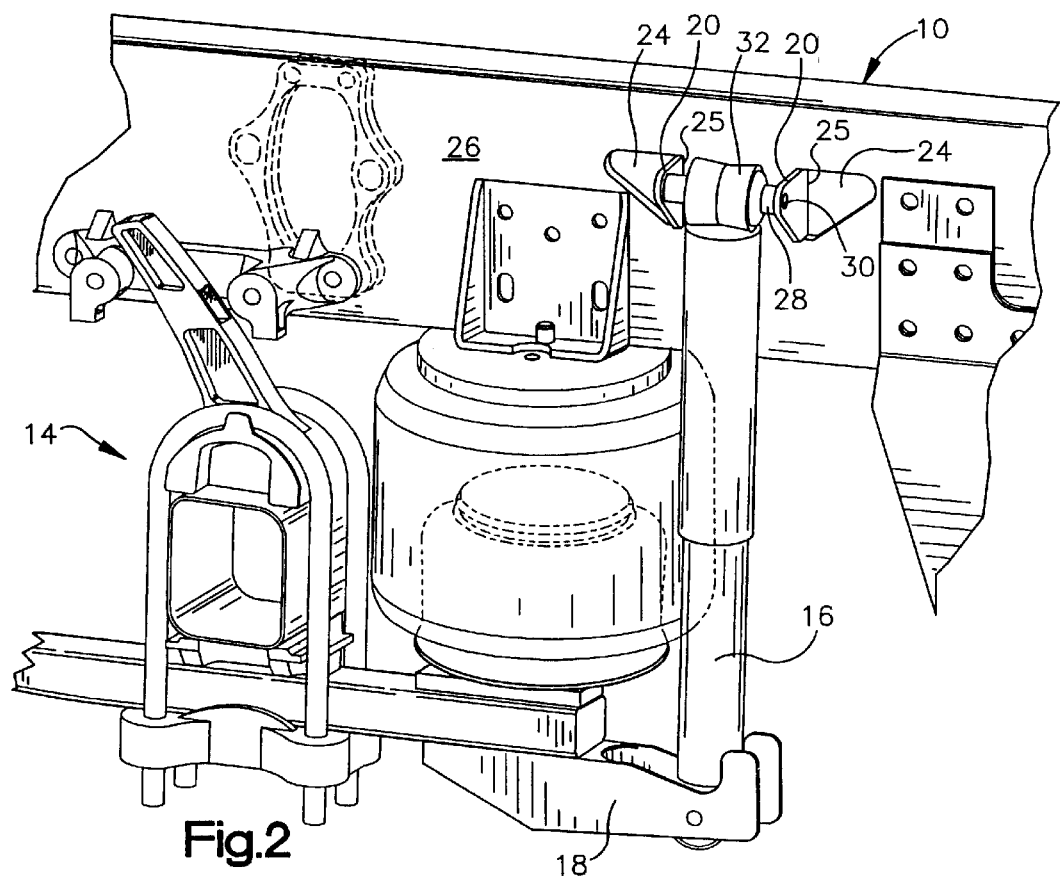
FIG. 2 is a perspective view of a suspension and frame portion of the arrangement shown in FIG. 1 and on an enlarged scale.
Figure 3:
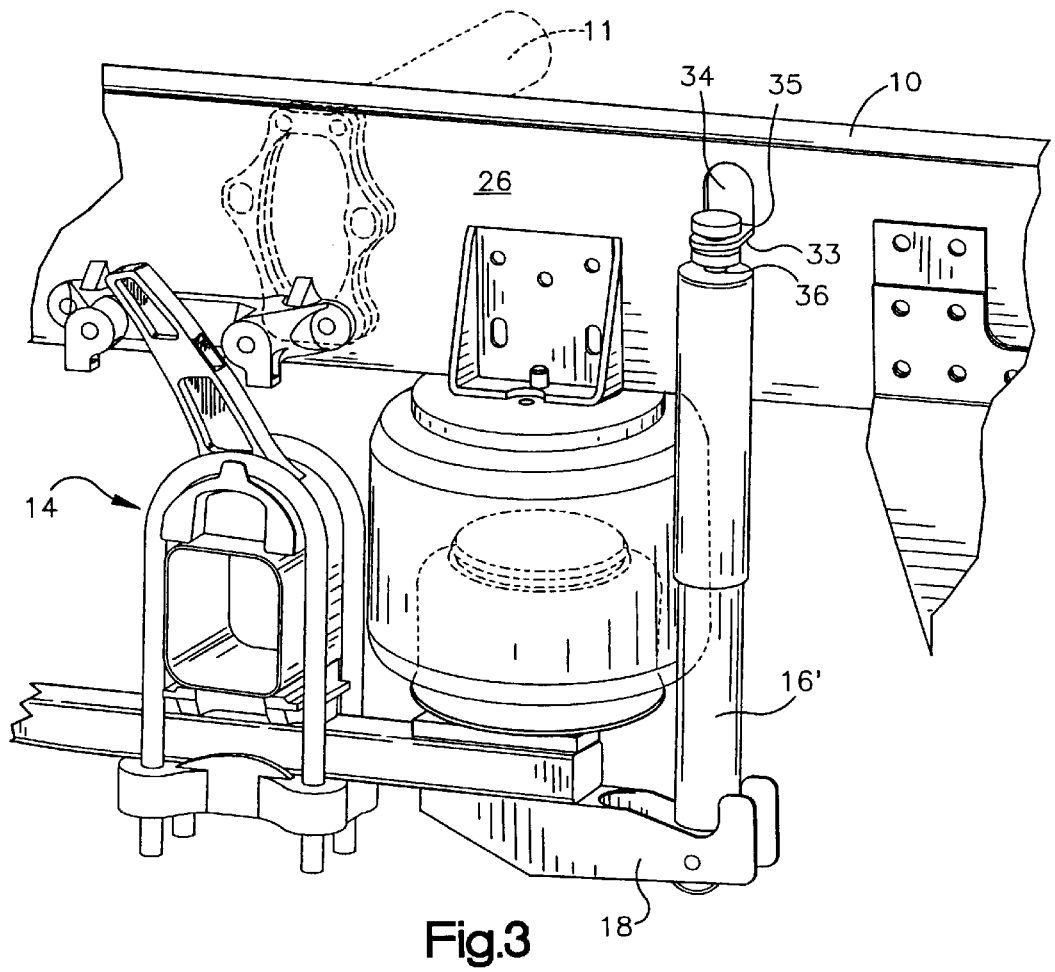
FIG. 3 is a view corresponding to FIG. 2 showing an alternate integral mounting bracket.
Figure 4:
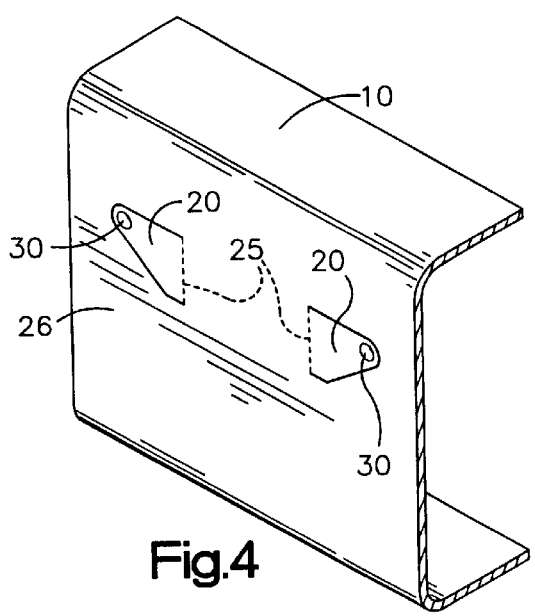
FIG. 4 is a foreshortened, perspective view of a section of a frame after a bracket has been cut to form a bracket cut out and punched; and, FIG. 5 is a view corresponding to FIG. 4 showing the frame after the cutout has been bent out of the plane of the rail.
Figure 5:
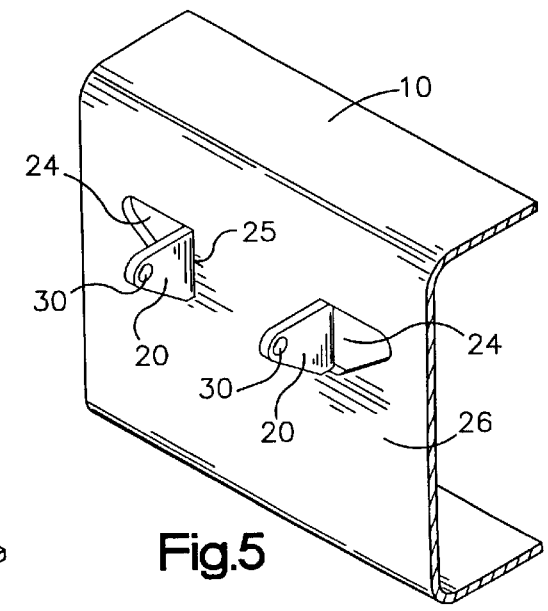

The connection of the shock absorber 16 to the frame rail 10 includes a pair of integral brackets 20 in the embodiment of FIGS. 1, 2, 4 and 5 and a single integral bracket in the embodiment of FIG. 3. In the embodiment of FIGS. 1 and 2 a pair of spaced bracket apertures 24 have been formed by cutting the frame rail 10 as a step in forming the brackets 20, as depicted in FIG. 4. After the bracket apertures are formed and fastener holes 30 are punched, also as depicted in FIG. 4, the brackets 20 are bent along junctures 25 between the cut out portions and the balance of the frame rail 10, FIG. 5. The brackets 20 are positioned in spaced parallel relationship. Each of the brackets 20 is in a respective imaginary, vertical plane normal to a vertical body portion 26 of the frame rail 10. As will be apparent from an examination of the drawings the vertical portion 26 is the body of a typical frame rail formed from an elongate channel.

The fastener holes 30 are axially aligned. A fastener 28 extends through the holes 30 in the brackets 20. The fastener 28 also extends through a top mounting portion 32 of the shock absorber 16 to secure the shock absorber to the frame 10.

In the embodiment of FIG. 3, a single bracket 33 is disposed in a generally horizontal plane when the vehicle is in use. In the FIG. 3 embodiment a bracket aperture 34 has been formed in the vertical portion 26. The single bracket 33 has been formed by bending a cut out portion from the plane of the vertical portion 26 along a juncture 35 of the single bracket 33 with the vertical portion 26 at the base of the aperture 34. The single bracket 33 is disposed in a generally horizontal plane normal to the vertical portion 26 when in use. Here a shock fastener 36 projects through a fastener hole in the single bracket 33 to secure the shock absorber 16' to the single bracket.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

In the claims:

1. For use in an over the highway motor vehicle, a frame comprising:
   a) a pair of elongate channel frame rails for positioning longitudinally of a highway vehicle when in use;
   b) a plurality of cross members interposed between and connected to the frame rails and maintaining the frame rails in predetermined spaced relationship;
   c) at least one of the rails including an integrally formed bracket projecting laterally outward from said at least one rail; and,
   d) the bracket being adjacent a rail aperture formed by cutting the at least one rail to define the bracket and after such cutting bending the bracket out of a plane of the at least one rail.

2. The frame of claim 1, wherein the bracket includes a through bracket hole for/receipt of a fastener.

3. The frame of claim 1, wherein there is at least one bracket formed in each frame rail.

4. The frame of claim 1, wherein the frame is for a heavy duty vehicle.

5. The frame of claim 4, wherein the heavy duty vehicle is a selected one of an over the highway tractor and a truck.

6. In the manufacture of an over the highway motor vehicle frame, said frame comprising a pair of elongate channel frame rails and a plurality of cross members interconnecting the rails, a bracket forming process comprising:
   a) cutting a body of at least one of the rails to form sides of a bracket cut out portion while leaving the cut out portion connected to the body; and,
   b) bending the cut out portion along the connection of the portion to the body to locate the portion as an integral bracket projecting laterally outwardly from the body for connection of a selected one of a vehicle component and an accessory.

7. The process of claim 6, further including the step of forming a hole in the portion.

8. The process of claim 7, wherein the hole is formed by a punch.

9. The process of claim 8, wherein the cut out portion is formed by stamping.

10. A vehicle frame having a bracket formed by the process of claim 9.

11. The process of claim 6, wherein the cut out portion is formed by stamping.

12. A vehicle frame having a bracket formed by the process of claim 6.

13. The process of claim 6 wherein the at least one rail is a channel.

14. A process of forming a bracket for connecting a vehicle component to a frame rail of a vehicle, the process comprising:
   a) cutting a body of the rail to form an outline of a substantial portion of the bracket in a planer section of body to form a bracket part while maintaining the bracket part integral with the body along a juncture;
   b) the bracket part along the juncture to position the bracket part as a lateral outward projection from the plane of the section; and,
   c) at a selected one of before the cutting step and after the cutting step and during the cutting step, forming a fastener receiving hole in the bracket part whereby to provide a frame with an integral bracket for connection of a vehicle component.

15. The process of claim 14, wherein a pair of complemental bracket parts are formed with aligned holes for connection of such component with a portion of the component positioned between the parts.

16. A vehicle frame having bracket parts formed by the process of claim 15.

17. A vehicle frame having a bracket formed by the process of claim 14.

18. The process of claim 14, wherein said component is a shock absorber.

19. In an over the highway vehicle, the vehicle being a selected one of a truck or a tractor, a frame comprising:
   a) a pair of elongate frame rails positioned longitudinally of the vehicle;
   b) a plurality of cross members interposed between and connected to the frame rails and maintaining the frame rails in predetermined spaced relationship;
   c) at least one of the rails including an integrally formed bracket projecting laterally outward from said at least one rail; and,
   d) the bracket being adjacent a rail aperture formed by cutting the at least one rail to define the bracket and after such cutting bending the bracket out of a plane of the at least one rail.

20. The vehicle of claim 19, wherein the bracket includes a through bracket hole for receipt of a fastener.

21. The vehicle of claim 19, wherein there is at least one bracket formed in each frame rail.

* * * * *